(No Model.)

D. F. ADAMS.
HINGE JOINT FOR JEWELRY.

No. 424,529. Patented Apr. 1, 1890.

WITNESSES:
Allen P. Young.
Henry J. Stapleton.

INVENTOR:
Dewey F. Adams,
by Edson Salisbury Jones
Attorney.

UNITED STATES PATENT OFFICE.

DEWEY F. ADAMS, OF PROVIDENCE, RHODE ISLAND.

HINGE-JOINT FOR JEWELRY.

SPECIFICATION forming part of Letters Patent No. 424,529, dated April 1, 1890.

Application filed October 22, 1888. Serial No. 288,817. (No model.)

*To all whom it may concern:*

Be it known that I, DEWEY F. ADAMS, of the city and county of Providence, and State of Rhode Island, have invented a new and useful Improvement in Hinge-Joints for Jewelry; and I do hereby declare the following specification, taken in connection with the accompanying drawings, forming a part of the same, to be a description thereof.

This invention relates to a hinge or pin-tongue joint for breastpins, lace-pins, badges, and other articles of jewelry; and it consists in certain features of construction and arrangement, hereinafter described and claimed.

Figure 1:
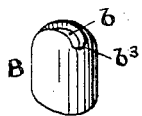
Figure 2:
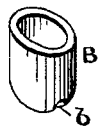
Figure 3:
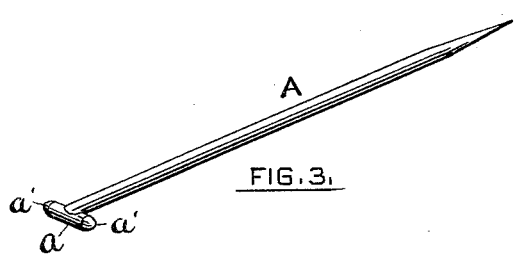
Figure 4:
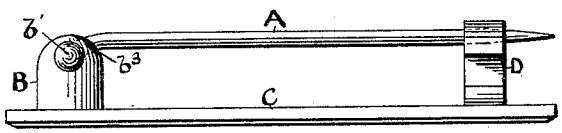
Figure 5:
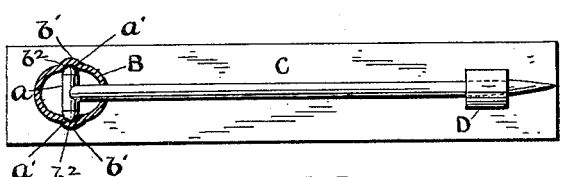

In the drawings, Figures 1 and 2 represent in perspective top and bottom views, respectively, of the cup-shaped member of the joint. Fig. 3 shows the pin-tongue member in perspective. Fig. 4 represents a side view of a breastpin having the improved joint. Fig. 5 shows a rear view of the same with the cup-shaped member in horizontal section.

A is the pin-tongue member, which is of a T shape, the head $a$ thereof, preferably, having its ends $a'$ tapered, as shown in Figs. 3 and 5, by being rounded or made conical.

B is the cup-shaped member of the joint, which is preferably struck up or formed from a piece of sheet metal. This member has a diametrical slot $b$ in its head, which head is closed and preferably dome shaped, so as to present no sharp corners or edges. The length of the slot $b$ is sufficient to allow the head $a$ of the pin-tongue to pass down through it into the cup, and the internal diameter of the cup is sufficient to allow said head to be turned therein into a position transversely of the slot. The member B is to be secured to the body C of a breastpin or other article of jewelry, and if attached by solder, as is preferable, it may be secured before the pin-tongue is combined therewith, so that the heat of the soldering operation shall not draw the temper of the pin-tongue, which is a very desirable feature.

In combining the pin-tongue A with the cup-shaped member B the head $a$ of the tongue is passed down into the cup through the slot $b$, and is then turned one-fourth of a revolution to bring it transversely of the slot. Suitable tools, as a pair of pliers, having oppositely-located cavities in the gripping-faces thereof, are now used to compress the upper portion of the member B transversely of the slot $b$ and to close the member B upon the ends $a'$ of the pin-tongue head, thereby producing on said member the bosses $b'$ with cavities $b^2$, which cavities form cup-shaped bearings for the ends of the head $a$, as shown in Fig. 5.

The slot $b$ in the member B not only allows the head of the pin-tongue to be inserted therein after said member has been secured to the body of an article of jewelry, but said slot also allows the pin-tongue to swing downward to be caught under the usual catch D, and upward when the article is to be removed, the wall or end $b^3$ of the slot $b$ acting as a fulcrum, upon which the pin-tongue is strained to keep it in engagement with said catch.

The T-shaped pin-tongue and the cup-shaped member B can be manufactured and sold to jewelers ready to be applied to articles of jewelry.

What I claim, and desire to secure by Letters Patent, is—

1. The combination of the T-shaped pin-tongue A and the cup-shaped member B, the said member having a slot $b$ in its head and cup-shaped bearings $b^2$ on its sides, which bearings surround and fit the ends of the pin-tongue head and pivot said pin-tongue to the member B, substantially as set forth.

2. The combination, with the body of an article of jewelry, of the T-shaped pin-tongue A, having the ends $a'$ of its head tapered, and the cup-shaped member B, secured to said body and having a slot $b$ in its head or top, and lateral bearings $b^2$ for the pin-tongue head, substantially as set forth.

DEWEY F. ADAMS.

Witnesses:
EDSON SALISBURY JONES,
GEO. W. CADY.